United States Patent

[11] 3,598,223

| [72] | Inventor | George E. Lauer<br>2960 Chapman St., Oakland, Calif. 94601 |
|---|---|---|
| [21] | Appl. No. | 858,076 |
| [22] | Filed | Sept. 15, 1969 |
| [45] | Patented | Aug. 10, 1971 |

[54] PEAR ORIENTATION APPARATUS
5 Claims, 6 Drawing Figs.

[52] U.S. Cl. .................................................. 198/33 AA,
193/43 R
[51] Int. Cl. .................................................. B65g 37/00
[50] Field of Search .................................................. 198/33 R;
193/43

[56] References Cited
UNITED STATES PATENTS
2,610,724  9/1952  Dudley, Jr. .................. 198/33.1

| 2,832,459 | 4/1958 | Lauer | 198/33 |
| 2,832,460 | 4/1958 | Lauer | 198/33.1 |

FOREIGN PATENTS
1,013,533  12/1955  Great Britain .................. 198/33 R

Primary Examiner—Gerald M. Forlenza
Assistant Examiner—Frank E. Werner
Attorney—Harris Zimmerman ABSTRACT: Apparatus for orienting pear halves, or similar irregularly contoured objects, with the cut flat face down and in longitudinal alignment with their direction of travel along the apparatus. The apparatus is such as to cause a pear half preliminarily oriented in a generally face down position to gravitally align itself at both its enlarged and narrow ends and be maintained in a final position of face down longitudinal alignment.

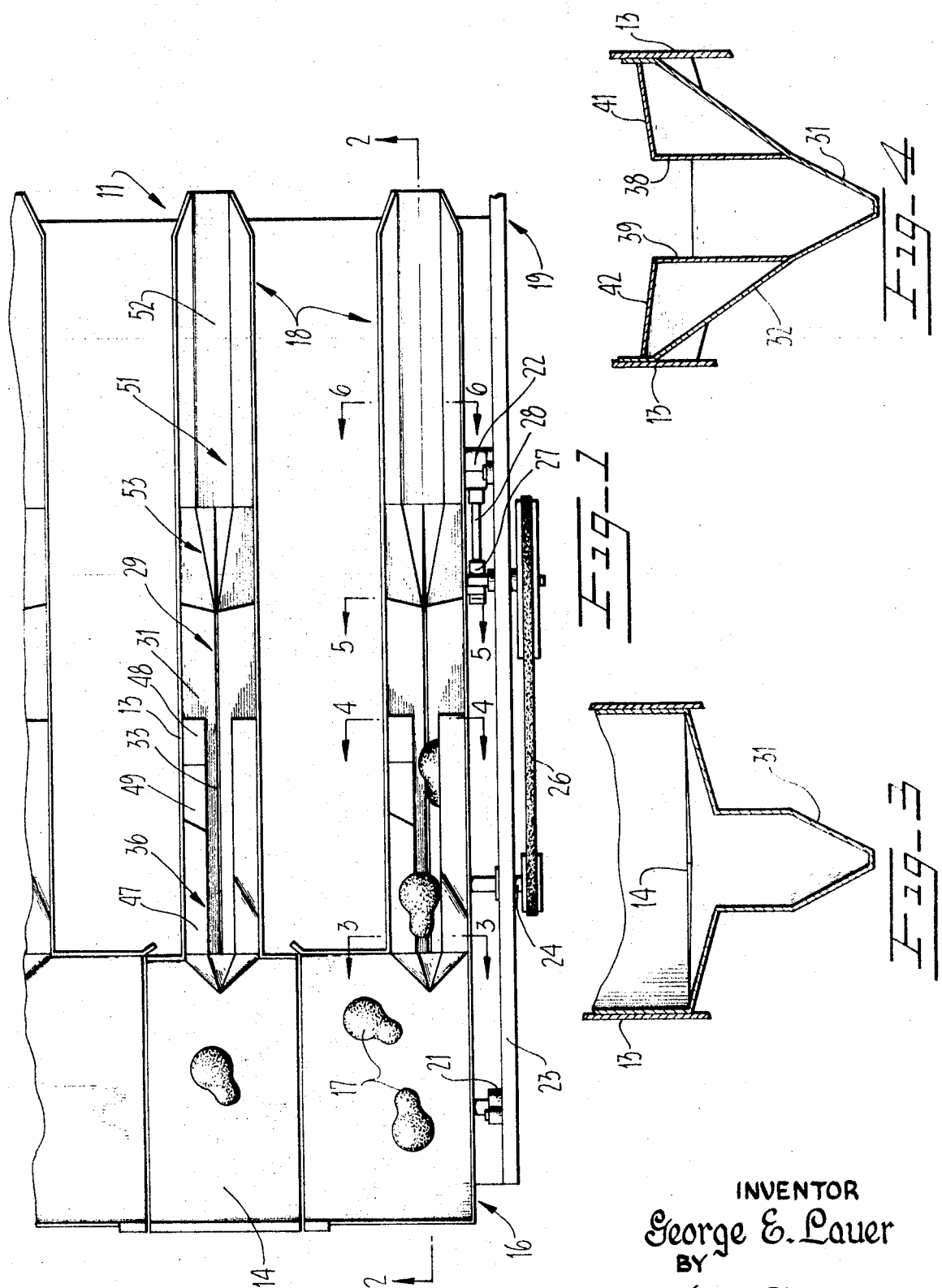

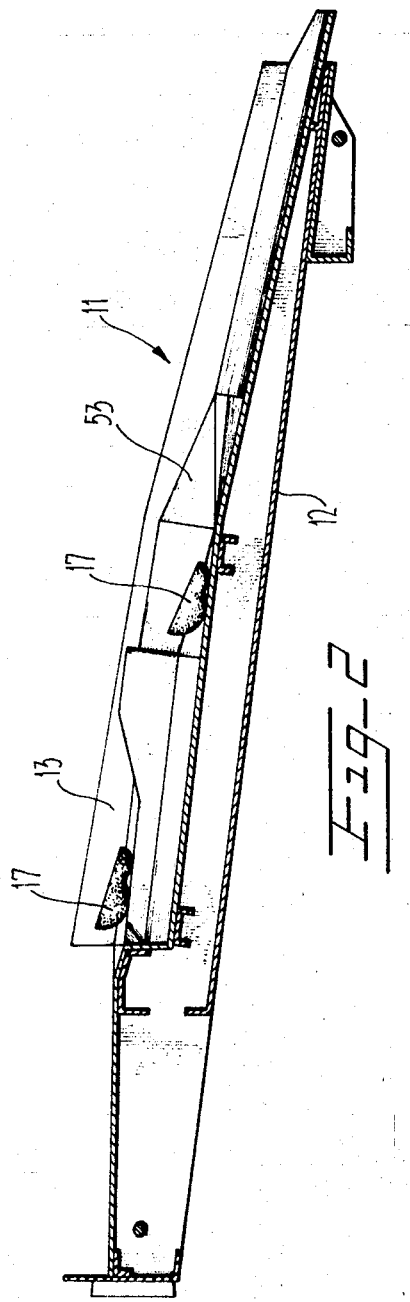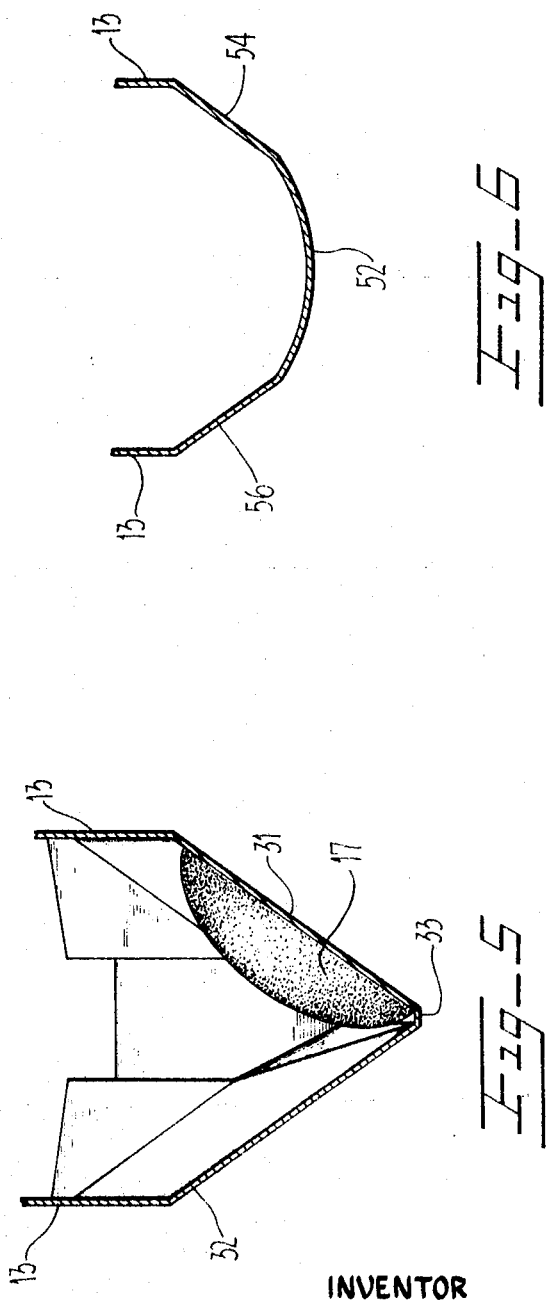

PEAR ORIENTATION APPARATUS

BACKGROUND OF THE INVENTION

In certain instances it is necessary to properly orient large quantities of cut pear halves, or the like, in face down longitudinally aligned position. In particular, in sorting of pear halves according to size it is necessary to measure the lengths of the halves, in which case the halves must be introduced to electronic measuring apparatus in positions of face down longitudinal alignment.

Various arrangements have been devised heretofore for orienting cut halved fruit into a cut face down position. Particularly effective apparatus for this purpose is disclosed in U. S. Pat. 2,832,459 to George Lauer. Basically such apparatus includes a longitudinally extending shaker table adapted to receive randomly oriented cut fruit halves at one end and discharge the fruit halves in cut face down position at the other end. In the accomplishment of the foregoing, the table reciprocates to advance the fruit halves along longitudinal grooves of generally V-shaped cross section extending between the receiving and discharge ends of the table. Guide members are provided in the grooves adjacent the receiving end of the table defining opposed vertical parallel walls restricting the general width of each groove to less than the diameter of the fruit halves. The guide members serve to tilt and retain the fruit halves with the cut faces thereof in a generally vertical plane between the parallel walls during advance of the fruit halves along the grooves and thereafter to guide same into positions of support with the cut faces in contact with laterally upwardly inclined surfaces of the grooves. The discharge end of the table is formed with a generally flat horizontal surface and the depth and width of the grooves are reduced as they merge with the flat surface, whereby the fruit halves as supported with their cut faces in contact with the inclined surfaces of the grooves are caused to fall gravitally cut face down onto the flat surface.

It will be appreciated that apparatus of the foregoing type is effective to orient cut fruit halves, including pear halves, in cut face down positions. However the face down pear halves as deposited on a flat horizontal surface are randomly oriented and thus do not have the desired longitudinal alignment. It has proven to be exceedingly difficult to orient pear halves along a longitudinal axis apparently because of their odd irregular shape. It has not been found possible to use any side bars or springs to align a pear half since once it strikes such a guide member, the pear half skids uncontrollably.

SUMMARY OF THE INVENTION

The general object of the present invention is to provide apparatus for automatically orienting cut pear halves, or similar odd irregularly shaped objects, into cut face down longitudinally aligned positions during their advance along the apparatus.

Apparatus in accordance with the invention generally includes means for moving cut pear halves into positions of support with the cut flat faces thereof in contact with longitudinally extending laterally upwardly inclined surfaces, and means defining a shallow groove having a base of generally arcuate cross section merging with the inclined surfaces to receive the pear halves therefrom in face down position and cause same to gravitally align themselves longitudinally at both their enlarged and narrow ends and retain a longitudinally aligned position during their advance along the groove.

The former means for positioning the pear halves with their faces in contact with inclined surfaces is advantageously provided in a manner analogous to that disclosed in the previously referenced U. S. Pat. 2,832,459. In this, regard, the positioning means preferably include a longitudinally extending shaker table having a generally planar apron, or the like, at one end for receiving the cut pear halves, and at least one groove of generally V-shaped cross section extending longitudinally therefrom. Each groove is formed with suitable guide means adjacent the receiving apron to restrict the general width of the groove to less than the width of the pear halves. Upon reciprocation of the table, the pear halves are longitudinally advanced into contact with the guide means and in encountering same are tilted to position the cut faces in a generally vertical plane. Subsequent to passing the guide means the pear halves enter a relatively wider unrestricted portion of the V-shaped groove and fall from their vertical positions into positions of support with the cut faces contacting the laterally inclined walls of the groove and generally longitudinally aligned therewith. Unlike the prior art apparatus, the groove does not terminate in a flat horizontal surface. In accordance with the particularly salient aspects of the invention, and as previously noted, means are provided to define a shallow groove having a base of generally arcuate cross section merging with the inclined walls of the V-shaped groove. The shallow groove is preferably provided as an arcuate base extension of the V-shaped groove with the inclined walls of the latter diverging laterally outward and the apex thereof coextensively merging with the arcuate base. The pear halves with their faces contacting the inclined walls and in general longitudinal alignment therewith are advanced longitudinally by the reciprocating movement of the table and gravitally positioned face down in contact with the arcuate base with generally longitudinal orientations. During the subsequent advance of the pear halves longitudinally along the arcuate base groove extension to a discharge end thereof, the pear halves further gravitally align themselves at their enlarged and narrow ends longitudinally of the groove. Each end of a pear half is then gravitally held against the arcuate base and does not move from its longitudinal alignment whereby the pear halves are delivered at the discharge end of the groove extension with cut face down longitudinally aligned orientations.

BRIEF DESCRIPTION OF THE DRAWINGS

The invention is illustrated in the accompanying drawings, wherein:

FIG. 1 is a plan view of a preferred embodiment of pear orientation apparatus in accordance with the present invention;

FIG. 2 is an elevational sectional view of the apparatus taken at line 2-2 of FIG. 1;

FIG. 3 is a transverse sectional view taken at line 3-3 of FIG. 1;

FIG. 4 is a transverse sectional view taken at line 4-4 of FIG. 1;

FIG. 5 is a transverse sectional view taken at line 5-5 of FIG. 1; and

FIG. 6 is a transverse sectional view taken at line 6-6 of FIG. 1.

DETAILED DESCRIPTION OF A PREFERRED EMBODIMENT OF THE INVENTION

Considering now the invention in detail with reference to the form thereof illustrated in the drawings, there will be seen to be provided pear orientation apparatus including a table 11 having base structure 12 and upright sidewalls 13. A generally planar horizontal apron 14 is provided at a receiving end 16 of the table upon which cut pear halves 17 are deposited with indiscriminate orientations, and the sidewalls laterally outwardly define at least one, and preferably a plurality of fruit conveyance channels 18 in communication with the apron and extending therefrom longitudinally of the table to a discharge end 19 thereof. Means are provided to advance the pear halves from the apron in a single file or files longitudinally along the channels to the discharge end 19, and in this regard the table is preferably inclined slightly downwardly from the receiving end to the discharge end while means are provided for longitudinally shaking or oscillating the table to effect the desired advance of the pear halves. In the illustrated case, the table is supported on longitudinally spaced links 21 and 22 pivotally carried on suitable framework 23. A motor having a rotary drive shaft 24 is coupled by a belt 26 in driving relation to a sheave 27, and the latter is provided with a crank arm 28 eccentrically carried by the sheave shaft. The distal end of the crank arm is pivotally connected to the table to thereby impart the desired shaking or oscillating movement for causing the pear halves to move longitudinally along the conveyance channels 18 towards the discharge end 19 of the table.

In the accomplishment of the primary objective of the invention, each channel 18 is so arranged that during advancement of the indiscriminately oriented pear halves 17 from the apron 14 longitudinally along the channel, the pear halves are appropriately moved and oriented to assume cut face down longitudinally aligned positioned by the time they reach the discharge end 19 of the table. In this regard, each channel is formed with a longitudinally extending groove 29 of generally V-shaped cross section defined by a pair of wall surfaces 31 and 32 oppositely laterally inclined upwardly to parallel spaced ones of the upright sidewalls 13 from a longitudinally extending apex intersection 33 transversely medially therebetween, as best shown in Figure 5. Means are provided in the groove adjacent the apron 14 to move the pear halves into positions of support with the cut faces thereof contacting the inclined surfaces 31 and 32 of the groove. As here illustrated, the latter means include a pair of guide members 34 and 36 disposed adjacent the apron 14 to restrict the general width of the groove and tilt the pear halves to positions wherein the cut faces thereof lie in generally vertical planes between the guide members. From such positions, the pear halves fall gravitally to contact the cut faces with the inclined surfaces in an unrestricted region 37 of the groove following the guide members as the pear halves are advanced longitudinally along the groove.

The guide members 34 and 36 preferably respectively include vertically disposed and longitudinally extending parallel-spaced sidewalls 38 and 39 intersecting the groove inclined wall surfaces 31 and 32 substantially medially of the height thereof and rising upwardly from the intersections, as best shown in Figure 4. The walls 38 and 39 terminate upwardly in oppositely directed laterally outwardly inclined top walls 41 and 42 which extend into intersection with the parallel-spaced channel defining sidewalls 13. The inclination of the top walls 41 and 42 is substantially less than that of the groove wall surfaces 31 and 32. From viewing Figures 3 and 4, it will be appreciated that the sidewalls 38 and 39 of the guide members 34 and 36 restrict the general width of the groove 29. It should be noted in this regard that the spacing between the sidewalls is such as to restrict the groove width to substantially less than the general width of the pear halves 17. In the region of the guide members the groove 29 hence is of a relatively deep restricted cross-sectional configuration including a relatively narrow V-shaped base defined by the lower intersecting portions of inclined surfaces 31 and 32 terminating in the width restricting vertical walls 38 and 39, in turn terminating upwardly in the gently inclined top walls 41 and 42. One guide member 34 is arranged such that the gently inclined top wall 41 thereof includes a relatively depressed section 43 substantially contiguous with apron 14 and extending longitudinally therefrom to an upwardly stepped longitudinal section 44 connected therewith by a longitudinally and laterally upwardly inclined transition section 46. The other guide member 36 is similarly arranged with its gently inclined top wall 42 including a relatively depressed section 47 substantially contiguous with apron 14 and extending longitudinally therefrom to an upwardly stepped longitudinal section 48 connected therewith by a longitudinally and laterally upwardly inclined transition section 49. It is to be noted that transition section 49 is longitudinally spaced from transition section 46 in the direction of advance of the pear halves 17 along the channel 18. In other words, the length of the depressed section 47 of inclined wall 42 is greater than that of depressed section 43 of inclined wall 41.

Considering now the action of the guide members 34 and 36 in effecting the desired orientation of the pear halves 17 indiscriminately deposited on the apron 14, it will be appreciated that as the pear halves are moved by the oscillating motion of the table 11 into each channel 18 they may assume a variety of different positions upon being initially deposited upon or between the guide members. If a pear half falls into the width restricted region of the groove 29 between the parallel spaced vertical sidewalls 38 and 39 of guide members 34 and 36, such pear half is already in the desired position wherein its cut face is in a generally vertical plane inasmuch as the groove width is substantially less than the general width of the pear halves being processed. When such a vertically positioned pear half is advanced to the unrestricted region 37 of the groove, it will move gravitally to contact the cut face thereof with one of the inclined surfaces 31 or 32, and ultimately assume a general longitudinal alignment therewith. However, many of the pear halves are initially deposited upon the depressed sections 43 and 47 of the guide member top walls 41 and 42 in overlying bridging relation to the restricted region of the groove 29. As these pear halves advance they encounter the transition section 46 of guide member 34 and are tilted in riding up same to the elevated section 43 of the guide member top wall. By virtue of the tilting action many of the pear halves now fall into the restricted region of the groove between the guide members such that the cut faces of the pear halves are disposed in substantially vertical planes. Those of the pear halves which have not already fallen into the restricted region of the groove are imparted a further lifting and tilting action in encountering the transition section 49 of guide member 36 and now fall into the restricted region of the groove. Consequently, all of the pear halves are positioned with their cut faces in substantially vertical planes by the time they reach the unrestricted region 37 of the groove. Thus, all pear halves will be supported with their cut faces contacting one of the inclined surfaces 31 or 32 in the unrestricted region of the groove and in general longitudinal alignment therewith.

It will be appreciated that to the extent thus far described the pear orientation apparatus is generally conventional and in basic respects similar to that disclosed in the previously referenced U. S. Pat. No. 2,832,459. However, heretofore the fruit halves have been delivered to a flat horizontal surface from the inclined surfaces of the groove such as by gradually diminishing the groove depth and merging same with the horizontal surface. Such measures are effective in orienting fruit halves with their cut faces down. With regular contoured fruits this is all that is required since the problem of longitudinal alignment does not arise. With a pear half or similar irregularly contoured object, however, it is frequently desirable to additionally orient same in alignment with its longitudinal axis. Although the pear halves are in general longitudinal alignment with the inclined surfaces 31 and 32 of the unrestricted region 37 of the groove, the pear halves skid from their longitudinal orientations upon encountering a flat horizontal surface. It has not been found possible to use side bars or springs to align a pear half since once it strikes same the pear half skids uncontrollably, apparently because of its odd shape.

In accordance with the particularly salient aspects of the invention, means are provided to orient the pear halves from the unrestricted region 37 of the groove in cut face down longitudinally aligned positions and hold the pear halves against movement from their longitudinal alignment. More particularly, such means as herein provided define a shallow groove extension 51 having a base 52 of generally arcuate cross section merging with the inclined surfaces 31 and 32 of the V-shaped groove 29 at the end of the unrestricted region 37 thereof, as best shown in Figure 6. The arcuate base extension extends longitudinally from the unrestricted region 37 to the discharge end 19 of the table. The V-groove inclined wall surfaces 31 and 32 diverge laterally outward, as indicated at 53, and the groove apex intersection 33 coextensively merges with the arcuate base 52. The base 52 preferably terminates upwardly in laterally outwardly inclined wall surfaces 54 and 56 which merge with the diverging portions of the V-groove wall surfaces 31 and 32. Wall surfaces 54 and 56 extend into intersection with the parallel-spaced channel defining sidewalls 13.

With the groove extension 51 thus provided, the pear halves supported with their cut faces contacting the inclined wall surfaces 31 and 32 and generally longitudinally aligned therewith, are gravitally positioned face down in contact with the arcuate base 52 in transversing the diverging surface portions indicated at 53. As the pear halves are longitudinally advanced along the groove extension by the reciprocating motion of the table, the pear halves further gravitally align themselves at their enlarged and narrow ends longitudinally of the arcuate base. Both the enlarged and narrow ends of a pear half are then gravitally held against the arcuate base such that the pear half does not move from its longitudinal alignment. As a result, the pear halves are delivered at the discharge end of the table with cut face down longitudinally aligned orientations.

I claim:

1. Apparatus for orienting pear halves in cut face down longitudinally aligned positions comprising means for moving cut pear halves into positions of support with the cut faces thereof in contact with longitudinally extending laterally upwardly inclined surfaces constituting wall surfaces of a longitudinally extending V-shaped groove oppositely laterally inclined upwardly from a longitudinally extending apex intersection, means defining a shallow groove having a base of generally arcuate cross section comprising a longitudinal extension of said V-shaped groove with said inclined wall surfaces diverging laterally outward and said apex intersection coextensively merging with said base of arcuate cross section, and means for advancing said pear halves longitudinally of said inclined surfaces and said groove whereby said pear halves are delivered from said inclined surfaces to said groove with the cut faces of the pear halves contacting said base and longitudinally aligned at both of their ends with said base.

2. Apparatus according to claim 1, further defined by said extension having outwardly inclined wall surfaces extending upwardly from said base of arcuate cross section, said wall surfaces of said extension merging with the diverging portions of the inclined wall surfaces of said V-shaped groove.

3. Apparatus according to claim 1, further defined by said V-shaped groove and said extension defining a pear half conveyance channel extending longitudinally from a receiving end to a discharge end of a longitudinally downwardly inclined table, said means for advancing said pear halves comprising means for longitudinally reciprocating said table.

4. Apparatus according to claim 3, further defined by said means for moving cut pear halves into positions of support with the cut faces thereof in contact with longitudinally extending laterally upwardly inclined surfaces including a pair of guide members disposed in said V-shaped groove adjacent said receiving end of said table for restricting the width of said V-shaped groove and tilting said pear halves to positions wherein the cut faces thereof lie in generally vertical planes between said guide members wherefrom said pear halves fall gravitally to contact their cut faces with said inclined wall surfaces of said V-shaped groove in an unrestricted region thereof.

5. Apparatus according to claim 4, further defined by said extension having outwardly inclined wall surfaces extending upwardly from said base of arcuate cross section, said wall surfaces of said extension merging with the diverging portions of the inclined wall surfaces of said V-shaped groove.